Oct. 13, 1964    E. NILSSON    3,152,630

TOOL FOR MOUNTING TUBES IN APERTURES

Filed Oct. 20, 1960

INVENTOR
ESKIL NILSSON
BY Howson & Howson
ATTYS.

United States Patent Office 3,152,630
Patented Oct. 13, 1964

3,152,630
TOOL FOR MOUNTING TUBES IN
APERTURES
Eskil Nilsson, Norrahammar, Sweden, assignor to Aktiebolaget Svenska Fläktfabriken, Stockholm, Sweden
Filed Oct. 20, 1960, Ser. No. 63,919
2 Claims. (Cl. 153—79)

The present invention relates to manufacturing heat exchangers and similar apparatus, and more particularly to a tool for mounting tubes rigidly and air-tightly in apertures in a wall. Such tubes have hitherto been mounted by expanding the tube ends by means of a rotatable rolling mandrel inserted into the tubes.

The primary object of the invention is to eliminate such complicated tools and achieve in a rapid and simple manner a rigid joint between tubes and wall.

In accordance with the invention the mounting is achieved by a partial expansion of the tube at the mounting point and is effected by a body of elastic material preferably of rubber which is inserted into the tube end, and by an axial compression is forced to expand radially and thereby expanding the tube end to press against the peripherical surface of said aperture. The apertures may be provided with peripheral flanges or collars having flared portions against which the tubes are to be pressed.

The invention provides a tool for accomplishing this method. The tool comprises a threaded bolt mounted in a shoulder plate for axial displacement and against rotation and provided with a cylindrical head to be inserted in said tube which is fastened and which has a diameter somewhat smaller than the inner diameter of the tube. A sleeve of rubber or similar elastic material having the same outer diameter as that of the bolt head is disposed between the bolt head and said shoulder plate and a nut engages the threaded part of said bolt on the opposite side of said shoulder plate, said nut when rotated causing an axial displacement of said bolt with respect to said shoulder plate to axially compress said sleeve, which sleeve owing to its steadily increasing diameter widens the end part of the tube and presses the tube wall against the peripheral surface of said aperture and/or its flange. Between the shoulder plate and the nut an axial ballbearing may suitably be disposed for facilitating the rotation of said nut. The preferred embodiment of the device includes a washer disposed between the sleeve and the shoulder plate and extending into the flared portion of the aperture, the tube end abutting against said washer which is provided with a curved undercut edge along which edge the tube end is forced to slide upon expansion of the tube end whereby the outermost end part of the tube is pressed to alignment against the flared part of the aperture.

The invention will now be described more in detail with reference to the accompanying drawing, illustrating an exemplifying embodiment of device according to the invention wherein FIG. 1 is a fragmentary vertical cross section through the tool showing its application to the tube in the aperture prior to the expansion of the tube;

Figure 1:
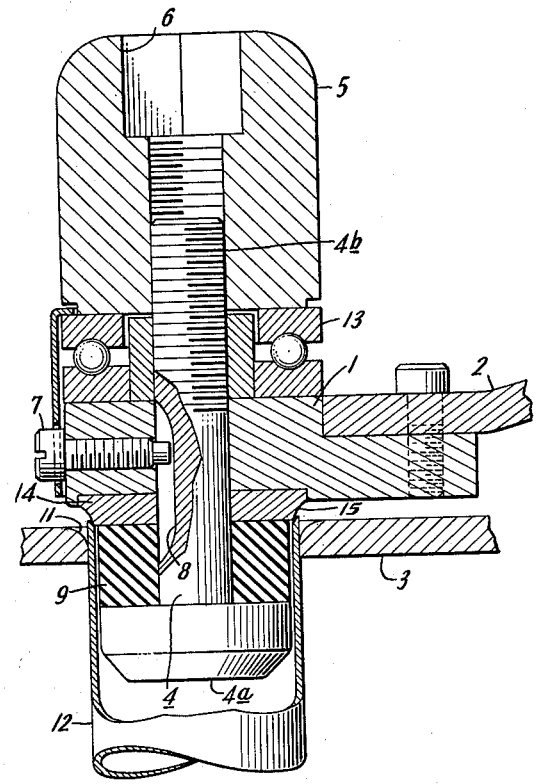
Figure 3:
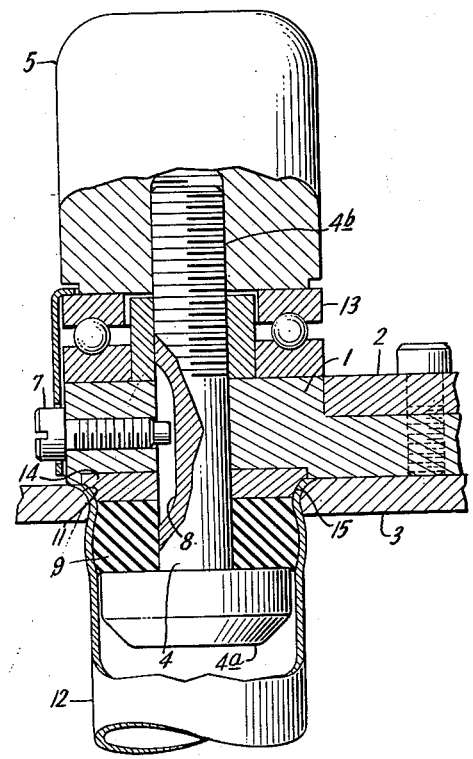
FIG. 3 is a view similar to FIG. 1 showing the position of the tool in the tube after its expansion and showing the rigid air-tight mounting of the tube in the aperture.
Figure 2:
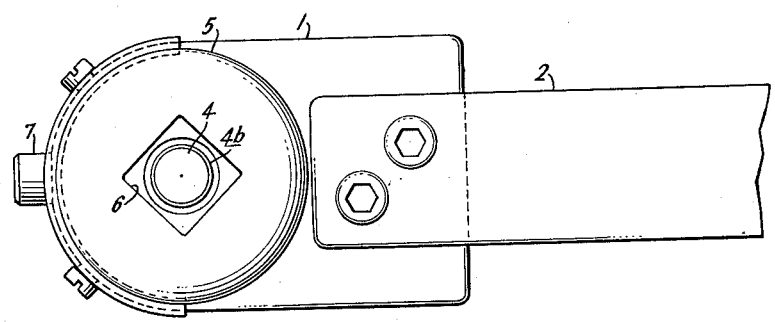
FIG. 2 is a plan view of a device.

In the drawing 1 designates a shoulder plate, which when using the tool by means of a handgrip 2 is held against the surface of a wall 3 having an aperture 11 adapted to receive a tube 12. A threaded bolt 4 is mounted in said shoulder plate and is provided with a cylindrical head $4^a$ to be inserted into said tube 12. The head has a diameter somewhat smaller than the inner diameter of the tube. The threaded part $4^b$ of said bolt engages a nut 5 located on the opposite side of said shoulder plate 1, said nut being provided with a recess 6 for a squared key by means of which the nut 5 can be rotated. An axial ball bearing is provided at 13 to facilitate rotation of the nut. To prevent the bolt from rotating together with said nut there is a screw 7 threaded into said shoulder plate which screw engages a groove 8 cut in the bolt 4. The bolt will, thus, only be axially displaced when the nut is rotated. 9 designates a sleeve of rubber or similar material having the same outer diameter as that of the bolt head. When axially displacing the bolt 4 with respect to said shoulder plate, said sleeve is axially compressed and increases in diameter. This, in turn, expands the end part of the tube and presses the tube wall against the peripheral surface of said aperture 11. It is noted that the outer edge of the aperture is flared. To expand the tube 12 into the flared portion of the aperture 11, a washer 14 having a curved undercut edge 15 is forced to slide inwardly of the tube to expand the outermost end part of the tube into pressed engagement with the flared portion of the aperture.

Figure 4:
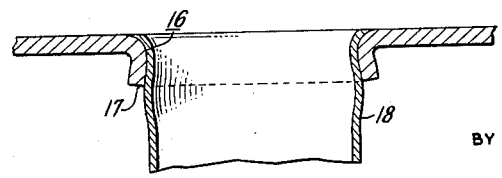
FIG. 4 is a view showing the mounting of a tube in a flanged aperture.

As shown in FIG. 4, when the aperture, in the present instance designated 16, is provided with a peripheral flange, as indicated at 17, the bend forming the flange provides a flared portion to receive the expanded outermost end part of the tube, as indicated at 18.

What I claim is:
1. A tool for mounting a tube in an aperture in a wall surface having a flared peripheral surface comprising a shoulder plate adapted to bear against said wall surface, a threaded bolt mounted in said shoulder plate, guide means to prevent rotation of said bolt and permit axial displacement thereof in said plate, a cylindrical head on said bolt adapted to be inserted in said tube and having a diameter somewhat smaller than the inner diameter of the tube, a sleeve of elastic material normally having the same outer diameter as that of the bolt head but increasing in diameter upon axial compression thereof, said sleeve being disposed between the bolt head and said shoulder plate, a nut engaging the threaded part of said bolt and arranged on the opposite side of said shoulder plate, said nut when rotated effecting an axial displacement of said bolt with respect to said shoulder plate and axially compressing said sleeve, the increasing diameter of said sleeve being operable to expand the end part of the tube to press the tube wall against the peripheral surface of said aperture, and a hard, non-resilient washer disposed between said sleeve and said shoulder plate and extending into said flared surface of the aperture, said washer being provided with a curved undercut edge corresponding to the flared surface and operable to slide inwardly of the tube upon compression of said sleeve, whereby the outermost end part of the tube is pressed against the flared part of the peripheral surface of said aperture by said hard, non-resilient washer.

2. A device according to claim 1 including an axial ball-bearing disposed between said shoulder plate and the nut for facilitating the rotation of said nut.

References Cited in the file of this patent
UNITED STATES PATENTS

| | | |
|---|---|---|
| 2,581,787 | Dreyer | Jan. 8, 1952 |
| 2,695,446 | Meyer | Nov. 30, 1954 |
| 2,704,104 | Mueller | Mar. 15, 1955 |
| 2,748,463 | Mueller | June 5, 1956 |